C. H. GUARD.

Hub for Vehicle-Wheels.

No. 6,273. Reissued Feb. 2, 1875.

*Witnesses.*

Wm. S. Bates

John E. Hutch.

*Inventor.*

Chauncey H. Guard

UNITED STATES PATENT OFFICE.

CHAUNCEY H. GUARD, OF TIPPECANOE CITY, OHIO, ASSIGNOR OF ONE-HALF INTEREST TO JOHN W. FORD, OF SAME PLACE.

IMPROVEMENT IN HUBS FOR VEHICLE-WHEELS.

Specification forming part of Letters Patent No. 146,250, dated January 6, 1874; reissue No. 6,273, dated February 2, 1875; application filed May 21, 1874.

*To all whom it may concern:*

Be it known that I, CHAUNCEY H. GUARD, formerly of Rockford, Illinois, now of Tippecanoe City, Ohio, have invented an Improvement in Carriage-Wheels, of which the following is a specification:

My invention relates to the hubs of wheels for land-carriages, or other purposes, when a wooden hub is employed; and consists in the method of banding, as will more fully hereinafter appear.

Figure 1:
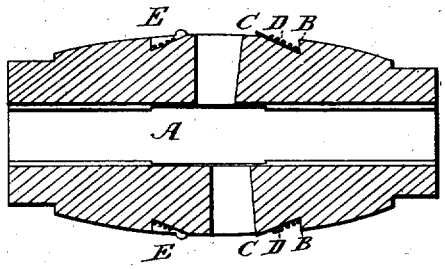
Figure 2:
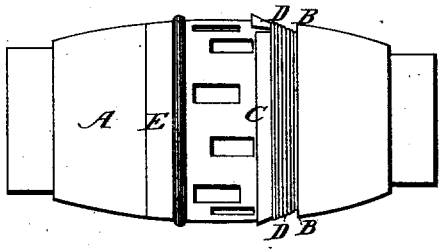

Figure 1 is a longitudinal sectional view of a hub embodying my invention. Fig. 2 is a side view of the same.

In the drawings, A represents a wooden hub of the usual form, the ends of which may be fitted to receive bands. B are grooves, encircling the hub near the ends of the mortises, which are designed to receive the spokes. I prefer to make the walls of these grooves toward the ends of the hub at right angles to its axis. C is a tin band, which I sometimes use to fit the grooves B, and is made to encircle the hub nearly, leaving sufficient space between its ends to admit of compression without causing its ends to overlap. D is a wire, the end of which is soldered or otherwise secured on the hub, and is wound around the hub spirally toward its center on the inclined wall of the groove B with any force within the capacity of the wire, and when the groove is filled to about the surface of the hub, or within the design of the finish contemplated, the wire is then cut, and the free end is soldered or otherwise secured to the tin band or hub. Solder is now employed in such a manner as to unite the wires in a mass, and to fill the groove to the surface of the hub, or to fill the design of the finish. It may then be finished, as represented at E, or to meet the tastes of the user.

The object of the inclined walls of the annular grooves B is, that the bands may overlap the ends of the wood fibers, to prevent them from rising or splitting from the force exerted on the sides and ends of the mortises in driving the spokes.

It is not the object of this invention to provide a wooden hub with a metallic band, furnishing a direct metallic support to the spokes of the same, or of greater diameter than the diameter of the wooden hub, but to provide a wooden hub strengthened by metallic bands that may be finished even with the wooden surface, or in any suitable or ornamental design, and that will resist the force exerted thereon in driving the spokes to prevent splitting or checking the hub.

I have represented my improved hub with V-formed grooves, tin bands wound with copper wire, united with solder, and finished as at E in the drawings; but I do not wish to confine myself to the particular form of groove, as grooves of different form would do nearly as well.

I prefer to use copper wire; but other kinds may be used, if desired.

The plate-bands C, when used, may be of tin or other metal; but in practice it will be found that the groove may be filled with a mass of wire wound tightly about the hub, and the whole made solid with solder without the use of any metal band beneath the wire, as shown on one side of the spokes at E, Fig. 1 of the drawing.

I prefer to apply my invention to the hub on each side of the spokes; but good results may be obtained in applying it to one side only.

I claim as my invention—

1. The combination of wooden hub A, having grooves B near the point where the spokes enter the hub, with wire D, wound in the grooves and soldered together, so as to form a solid mass, as described.

2. The wooden hub A, with one or more annular grooves, B, near the point where the spokes enter, in combination with plate-bands C and wire D, filling said grooves, substantially as described.

3. The combination of a metallic band composed of wire and solder with a wooden hub containing annular grooves, as shown and described.

4. The combination of a grooved wooden hub and a metallic band, when said band is wholly or partially held in place, and finished by the application of melted metal, as set forth.

CHAUNCEY H. GUARD.

Witnesses:

WM. S. BATES,

JOHN E. HATCH.